United States Patent [19]

Palmer

[11] 3,899,375

[45] Aug. 12, 1975

[54] METALLIC PHOSPHIDE COMPOSITION FOR USE IN AQUATIC FLARES

[75] Inventor: Malcolm George Palmer, Blakedown, Near Kidder Winster, England

[73] Assignee: Erco Industries Ltd., Islington, Canada

[22] Filed: Apr. 27, 1973

[21] Appl. No.: 355,194

Related U.S. Application Data

[63] Continuation of Ser. No. 46,996, June 17, 1970, abandoned.

[30] Foreign Application Priority Data

June 20, 1969 United Kingdom............... 31293/69

[52] U.S. Cl................................. 149/29; 423/299
[51] Int. Cl. ........................ C06d 1/10; C06c 9/00
[58] Field of Search...................... 149/29; 423/299

[56] References Cited
UNITED STATES PATENTS

| 862,093 | 7/1907 | Morehead............................ 149/29 |
| 3,397,038 | 8/1968 | Minklei et al...................... 423/299 |

FOREIGN PATENTS OR APPLICATIONS

| 647,205 | 12/1950 | United Kingdom.................. 149/29 |

OTHER PUBLICATIONS

Bailar, *Inorganic Synthesis*, Vol. IV, pp. 23–24, McGraw–Hill Book Company, Inc., (1953), New York, QD151, I 58.

Van Wazer, *Phosphorus and Its Compounds*, Vol. I, pp. 130–133, 147, 180 & 181, Interscience Publishers, Inc., (1958), New York, QD 181 P1V3.

*Primary Examiner*—Benjamin R. Padgett
*Assistant Examiner*—E. A. Miller
*Attorney, Agent, or Firm*—Herbert H. Goodman

[57] ABSTRACT

Phosphide compositions comprising the phosphides of aluminum and sodium. The compositions may be intermixtures of aluminum phosphide and trisodium phosphide. They may also be the chemical reaction product obtained by reacting aluminum, sodium and phosphorus. When contacted with sea water, the phosphide compositions produce a copious supply of spontaneously inflammable phosphine which is useful as a phosphine generator in aquatic flares and light buoys. Optimally the compositions contain aluminium, sodium and phosphorus in amounts of from 1:1 to 2:1 moles of AlP to $Na_3P$.

2 Claims, 1 Drawing Figure

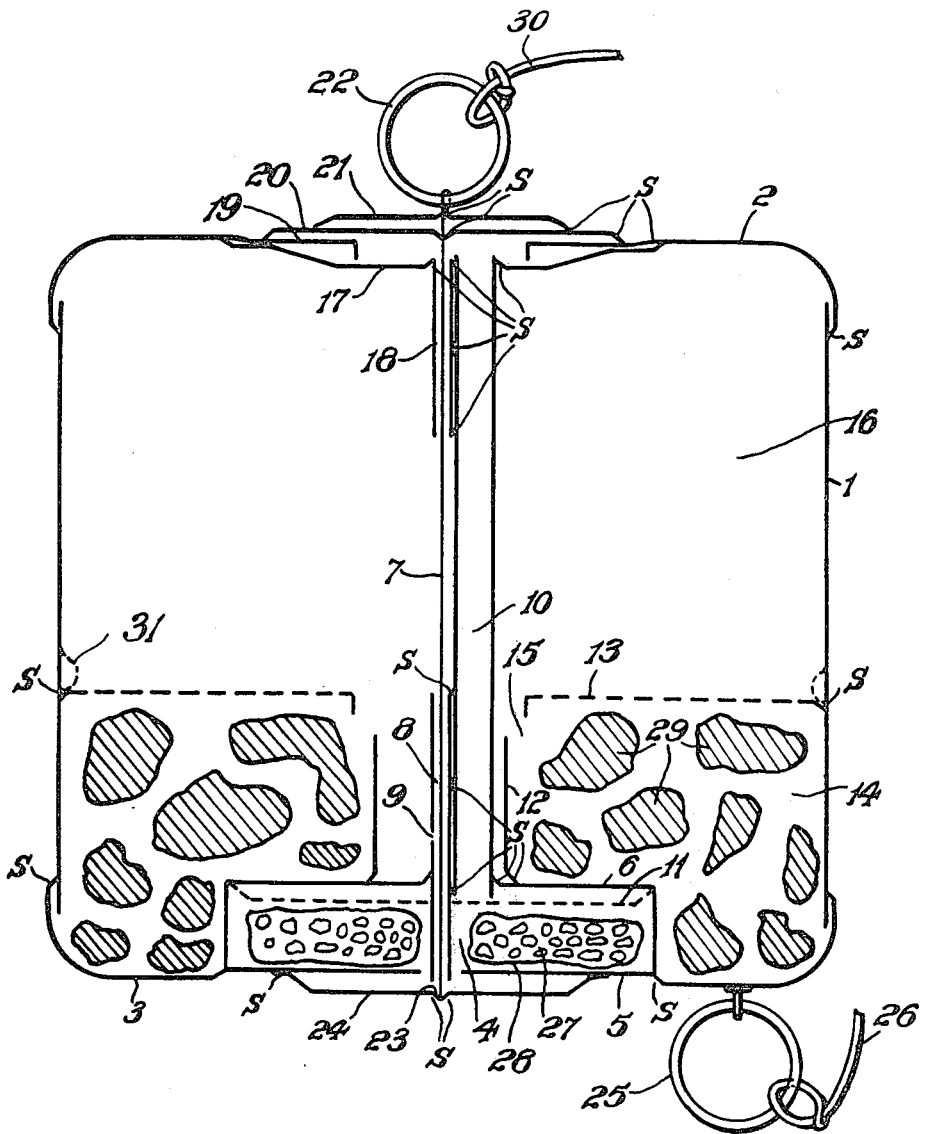

METALLIC PHOSPHIDE COMPOSITION FOR USE IN AQUATIC FLARES

This is a coninuation, of application Ser. No. 46,996, filed June 17, 1970, now abandoned.

This invention relates to metallic phosphides, which find use as phosphine generating chemicals in aquatic flares or light buoys.

Traditionally aquatic flares comprise a buoyant canister comprising one chamber containing an acetylene producing substance, usually sodium carbide, and another chamber containing a phosphine producing substance. When the flare comes into contact with water, for example when it is thrown into the sea, means are provided whereby water may enter the carbide and phosphide chambers so as to bring about the simultaneous evolution of phosphine and acetylene. These gases are released in juxtaposition at the top of the canister where the phosphine spontaneously ignites in air and the phosphine flare produced ignites the acetylene, thereby generating a flame which lasts until the supply of carbide and/or phosphide is exhausted. More recent types of flare dispense with the carbide and rely on phosphine alone to maintain the flame.

Previously available phosphides suggested for use in these devices generally fall into one of two classes, being either such as will produce a relatively poor supply of fairly impure phosphine or such as will produce a more copious supply of fairly pure phosphine. In the second case the phosphine produced is in fact so pure that it will not necessarily ignite spontaneously in air. In order to obtain the maximum supply of self-igniting phosphine for use in an aquatic flare, it has previously been necessary to employ a combination of two different phosphides of the types mentioned above. Most often these have had to be contained in separate chambers.

We have now discovered that a mixed phosphide of sodium and aluminium produces, on reaction with water, a good supply of phosphine of sufficient impurity to ignite spontaneously in air. A chemical combination or intermixture of the phosphides of sodium and aluminium is novel and constitutes one aspect of this invention. Reference to a chemical combination or intermixture of the phosphides of sodium and aluminium and two sodium aluminium phosphides, herein refers to the product of the Example herein.

From another aspect the invention provides aquatic flares comprising, as a phosphine generating material, a chemical combination or intermixture of the phosphides of sodium and aluminium. In general such flares will consist essentially of a buoyant container means; a chemical combination or intermixture of phosphides of sodium or aluminium within said container means and a nozzle means intercommunicating between the outside and said container means; said container means having an inlet means for bringing sea water into contact with said phosphides on partial immersion of the flare in the sea and said nozzle means being disposed to permit release of phosphine generated from said phosphides to the outside whereby a flare is produced. Such flares may be of any known suitable construction. A typical novel flare is now described with reference to the accompanying drawing.

BRIEF DESCRIPTION OF DRAWING

The drawing is a diagrammatic elevational cross-section of such an aquatic flare.

The flare comprises a canister consisting of a cylindrical case (1) with soldered end caps (2,3). The base cap (3) has a central circular aperture to the periphery of which is soldered an inwardly-projecting cylindrical phosphide chamber (4) having integral end plates (5,6), the base end plate (5) having a small central circular aperture and the top end plate (6) having a small central circular aperture with an adjacent larger circular aperture. Through these two central circular apertures and throughout the length of the light there runs a central spoke member (7). A water-inlet tube (8) of 5/64 inch bore surrounds the spoke member itself projecting from beyond the base end plate (5) of the phosphide chamber to a point about one-third the length of the flare; the tube is open at both ends and also has an aperture (9) at a point above the top end plate (6) of the phosphide chamber (4). To the water-inlet tube is soldered a phosphine carrier tube of bore ¼ inch (10) which runs from the adjacent circular aperture in the end plate (6) to the top of the flare.

The integral combination of the water-inlet and phosphine carrier tubes is soldered to the periphery of the adjacent circular apertures in the end plate (6). Inside the phosphide chamber (4) and just below the projecting end of the phosphine carrier tube is disposed a perforated diaphragm (11). To the top end plate (6) is soldered an upstanding cylindrical member (12) and, at approximately the inner end of the water tube (8), a circular perforated diaphragm member (13) having a central wide aperture is soldered to the case (1). The diaphragm member together with the member (12), the walls and top end plate of the phosphide chamber (4) and the base cap (3) of the flare defines a carbide chamber (14) which is open at the aperture (15) and through the perforations in the diaphragm (13). Between the diaphragm member (13) and the top cap (2) lies a buoyancy chamber (16). Optionally but preferably, the case (1) incorporates an internal covex circumferential groove (31, illustrated by dotted lines) against which the circular perforated diaphragm member (13) is conveniently located; this groove strengthens the canister allowing it to be dropped from a considerably greater height without damage than when not present.

The top cap (2) has an integral dished central portion (17) having a small central circular aperture with an adjacent larger circular aperture. Through this aperture and soldered to it projects the upper end of the phosphine carrier tube (10) to the side of which has been soldered an acetylene carrier tube of bore 5/64 inch (18). To the top surface of the dished member (17) is soldered an annular plate-supporting member (19) and on the top of this is soldered a circular load sealing plate (20) through which the spoke member (7) projects, the spoke member being soldered to the undersurface of the sealing plate (20). Soldered to the top surface of the sealing plate is a cap (21) above which is a ring (22) of 1 inch diameter. The spoke member (7) at its top end passes through the cap (21), around the ring (22) and back through the cap (21) to which it is soldered.

The lower end of the spoke member (7) is sealed by solder into a central aperture (23) in a dished cover plate (24) itself sealed at its circumference to the outer surface of the base end plate (5) of the phosphide chamber (4). The base cap (3) of the flare has attached to it a ring (25) of 1 inch diameter by which the flare may be connected to a lifebuoy by a rope (26).

The flare is assembled by soldering the component parts together at the points (S). During the assembly about three-fourths ounce of sodium aluminium phosphide (27) contained in a cotton bag (28) is placed in the phosphide chamber (4) and about 1.5 pounds of granular calcium carbide (29) placed in the carbide chamber (14).

The flare is normally stored ready for use in an emergency near the side of a ship, it being attached to a firm object by a length of rope (30) secured at the other end to the ring (22). To the ring (25) is usually attached a lifebuoy by means of a rope (26).

When the flare is thrown into the sea, the rope (30) becomes taut and the resulting jerk to the ring (22) causes the spoke member (7) to be pulled upward breaking the lead sealing plate (20) and the solder closing the aperture (23) in the cover plate (24); the spoke member (7) together with the sealing plate (20), the cap (21) and ring (22) then become detached from the flare. Through the aperture (23) water enters into the phosphide chamber (4) and passes through the water-inlet tube (8), the aperture (9) and the open top end of this tube into the carbide chamber (14). The water reacts with the sodium aluminium phosphide (27) causing the evolution of phosphine through the phosphine carrier tube (10) to the top of the light which is now open to the air and, on contact with the air, the phosphine spontaneously ignites. The water entering the carbide chamber (14) reacts with the calcium carbide (29) with the evolution of acetylene which passes to the top of the light through the acetylene carrier tube (18) where it is ignited by the phosphine flame.

If the acetylene flame is extinguished by water washing over the top of the flare it is almost immediately re-ignited by the phosphine which continuously evolves throughout the life of the flare. As the carbide is consumed water progressively fills the buoyancy chamber (16) until it reaches approximately the level of the lower end of the acetylene carrier tube (18) at which point the buoyancy of the flare is lost and it sinks so that burnt-out flares do not remain as a floating hazard.

It is convenient if the component parts of the flare are constructed of tin plate of thickness 0.01 – 0.02 inch. The spoke member needs to be more rigid and is usually of steel; a spoke having a diameter of 0.06 inch is suitable. The flare is conveniently one having overall dimensions of diameter 5–6 inches and height 6–8 inches, the buoyancy chamber being sufficiently large to permit the flare to float during use. The dimensions of the water-inlet, phosphine carrier and acetylene-carrier tubes have a fairly critical inter-relationship which can be determined by simple experiment for any given size of flare. Thus the water-inlet tube should be of such diameter that an adequate supply of water to the carbide chamber is provided but such that the granular carbide cannot enter the tube and block it. The size of the acetylene-carrier tube determines to some extent the rate of evolution of the acetylene and should not therefore be too large. The phosphine-carrier tube must, however, be of larger diameter to permit the phosphine to be evolved readily and to prevent it being blocked by phosphide particles entering the bottom of the tube or flotsam being washed into the top end of the tube. We have found that very satisfactory results are obtained with tubes of the dimensions given in the description of the aforesaid particular embodiment. To inhibit the blocking of the tube with unreacted phosphide particles the phosphide is conveniently contained in a cotton bag and a perforated diaphragm provided in the phosphide chamber as illustrated.

An alternative type of novel flare of the invention may dispense with carbide and rely only on phosphine to produce the flame. The construction of such a flare may be simplified considerably over that of the flare described and in its basic form such a phosphine-only flare will consist essentially of a buoyant canister member having a longitudinal internal cavity comprising a lower inlet end and an upper outlet end; a tube member within said cavity defining an annular volume therethrough; sodium aluminium phosphide situated at an intermediate point along the length of said annular volume; means for retaining said tube member and said sodium aluminium phosphide in position; reversible closure means at each of said ends of said cavity and nozzle means at said outlet end; there being perforations in said tube means at the location of said sodium aluminium phosphide whereby a removal of said closure means and immersion of the canister in the sea water enters said cavity at inlet end passes up said cavity and contacts said phosphide via said perforations to generate phosphine which enters said cavity via said perforations passes up said cavity and emerges from said upper outlet end via said nozzle means to produce a flame.

The novel phosphide combination used should be an intimate dispersion or a chemical compound of the two metallic phosphides and is therefore desirably prepared by reacting phosphorus with a mixture of both sodium and aluminium according to known methods, e.g. by passing phosphorus vapour over a mixture of the two metals or by heating white phosphorus with the metallic mixture in the absence of oxygen.

The ratios of sodium and aluminium to the phosphorus employed should be such as to provide substantially the stoichiometry demanded by a mixture of sodium and aluminium phosphides, $Na_3P$ and $AlP$. The ratio between the quantities of hypothetical sodium and aluminium phosphides in the compositions may be chosen with regard to the desired characteristics of the flare. Sodium phosphide tends to produce more easily inflammable phosphine whilst aluminium phosphide gives a higher molar yield of rather less readily inflammable phosphine. Molar ratios of hypothetical $AlP$ to $Na_3P$ in the novel compositions of from 1:1 to 2:1 have proven especially satisfactory.

A method of preparing the novel phosphides for use in standard types of aquatic flares and light buoys will now be described with reference to the following example.

EXAMPLE 9 lbs. of aluminium powder and 23 lbs. of sodium with 22 lbs. of amorphous phosphorus contained in oil were loaded in layers into a metal box to which a drop-on lid was then fitted.

The box was placed inside a vented furnace and heated with a gas flame until reaction commenced. After termination of reaction and cooling the lid was removed and the product covered with paraffin to prevent reaction with atmospheric moisture. The product was then broken up and stored under paraffin until required for use. For use in a flare, the product was mixed with about 10% of its weight of kieselguhr and compressed in a pelletizer into the form of discs of ca. 1 inch diameter and ½ inch thickness.

We claim:

1. A phosphide composition which upon contact with sea water releases phosphine gas in high yield, said phosphine gas being readily self-inflammable when contacted with air, said phosphide composition comprising the reaction product prepared by reacting aluminium and sodium with phosphorus in the absence of oxygen, and recovering the said reaction product.

2. The phosphide composition of claim 1 containing aluminium, sodium and phosphorus in amounts such that all of the aluminium is calculated as AlP, all of the sodium as $Na_3P$, and all of the phosphorus as said AlP and $Na_3P$, and the molar ratio of said AlP to said $Na_3P$ is from 1:1 to 2:1.

* * * * *